(12) United States Patent
Kobre

(10) Patent No.: US 7,925,151 B2
(45) Date of Patent: Apr. 12, 2011

(54) DEVICE FOR REDIRECTING AND REFLECTING LIGHT FROM CAMERA FLASH AND METHODS FOR USING SAME

(76) Inventor: Kenneth R. Kobre, San Francisco, CA (US)

( * ) Notice: Subject to any disclaimer, the term of this patent is extended or adjusted under 35 U.S.C. 154(b) by 309 days.

(21) Appl. No.: 12/023,990

(22) Filed: Jan. 31, 2008

(65) Prior Publication Data

US 2008/0181598 A1 Jul. 31, 2008

Related U.S. Application Data

(60) Provisional application No. 60/898,570, filed on Jan. 31, 2007.

(51) Int. Cl.
*G03B 15/06* (2006.01)
*H04N 5/222* (2006.01)

(52) U.S. Cl. ........................................ 396/174; 348/371

(58) Field of Classification Search .................. 396/174, 396/155; 348/370, 371
See application file for complete search history.

(56) References Cited

U.S. PATENT DOCUMENTS

| | | | |
|---|---|---|---|
| 1,930,315 A | 10/1933 | Kobayashi |
| 2,763,772 A | 9/1956 | Hine |
| 3,479,497 A | 11/1969 | Wolff |
| 4,066,885 A | 1/1978 | Weinberg |
| 4,078,170 A | 3/1978 | Sloop |
| 4,616,293 A | 10/1986 | Baliozian |
| 4,757,425 A | 7/1988 | Waltz |
| D312,471 S | 11/1990 | Couch |
| 5,251,115 A | 10/1993 | Hillman et al. |
| 5,337,104 A | 8/1994 | Smith et al. |
| 5,778,264 A | 7/1998 | Kean |
| D399,862 S | 10/1998 | Baliozian |
| 5,839,006 A | 11/1998 | Beckerman |
| 6,094,545 A | 7/2000 | Petitjean |
| D547,353 S | 7/2007 | Couch |
| 7,360,909 B1 | 4/2008 | Hughes |
| D585,587 S | 1/2009 | Fan |

OTHER PUBLICATIONS

LightSphere-II Inverted Dome Diffusion System; http://store.garyfonginc.com/Iiiido.html; Apr. 24, 2008; pp. 1-12.
Bounce Kit; http://www.lumiquest.com; Apr. 24, 2008; pp. 1-3.
Pocket Bouncer (LQ-101); http://www.lumiquest.com/lq871.htm; pp. 1-3, 2008.
Big Bounce (LQ-104); http:www.lumiquest.com/lq881.htm; pp. 1-2, 2008.
Omni-Bounce; http:www.stofen.com/info/index.htm; Apr. 24, 2008.
U.S. Appl. No. 29/306,883, filed Apr. 17, 2008, Kenneth R. Kobre, Notice of Allowance and Fee(s) Due, Jul. 20, 2009.

(Continued)

*Primary Examiner* — Rochelle-Ann J Blackman
(74) *Attorney, Agent, or Firm* — Ballard Spahr LLP

(57) ABSTRACT

Devices and methods are provided for redirecting or reflecting light from a camera's built-in flash unit. An exemplary device has a reflector member having a substantially planar surface, at least a portion of which is a reflective surface. A connecting member is provided that has a distal end portion and an opposing proximal end portion. The distal end portion can be attached to the reflector member and the proximal end portion can be configured for releasable mounting to a portion of the camera. The device can be operatively attached to the camera such that the reflector member is spaced from and opposes the flash and is configured to receive and reflect substantially all light produced from the flash.

22 Claims, 17 Drawing Sheets

OTHER PUBLICATIONS

U.S. Appl. No. 29/306,883, filed Apr. 17, 2008, Kenneth R. Kobre, Part B-Fee(s) Transmittal, Jul. 20, 2009.
U.S. Appl. No. 29/306,883, filed Apr. 17, 2008, Kenneth R. Kobre, Determination of Patent Term Extension or Adjustment under 35 U.S.C. 154(b), Jul. 20, 2009.
U.S. Appl. No. 29/306,883, filed Apr. 17, 2008, Kenneth R. Kobre, Notice of Allowability for a Design Application Jul. 7, 2009.
U.S. Appl. No. 29/306,883, filed Apr. 17, 2008, Kenneth R. Kobre, Examiner's Comment, Jul. 20, 2009.
U.S. Appl. No. 29/306,884, filed Apr. 17, 2008, Kenneth R. Kobre, Notice of Allowance and Fee(s) Due, Jul. 27, 2009.
U.S. Appl. No. 29/306,884, filed Apr. 17, 2008, Kenneth R. Kobre, Part B-Fee(s) Transmittal, Jul. 27, 2009.
U.S. Appl. No. 29/306,884, filed Apr. 17, 2008, Kenneth R. Kobre, Determination of Patent Term Extension or Adjustment under 35 U.S.C. 154(b), Jul. 27, 2009.
U.S. Appl. No. 29/306,884, filed Apr. 17, 2008, Kenneth R. Kobre, Notice of Allowability for a Design Application, Jul. 27, 2009.
U.S. Appl. No. 29/306,884, filed Apr. 17, 2008, Kenneth R. Kobre, Examiner's Comment, Jul. 27, 2009.

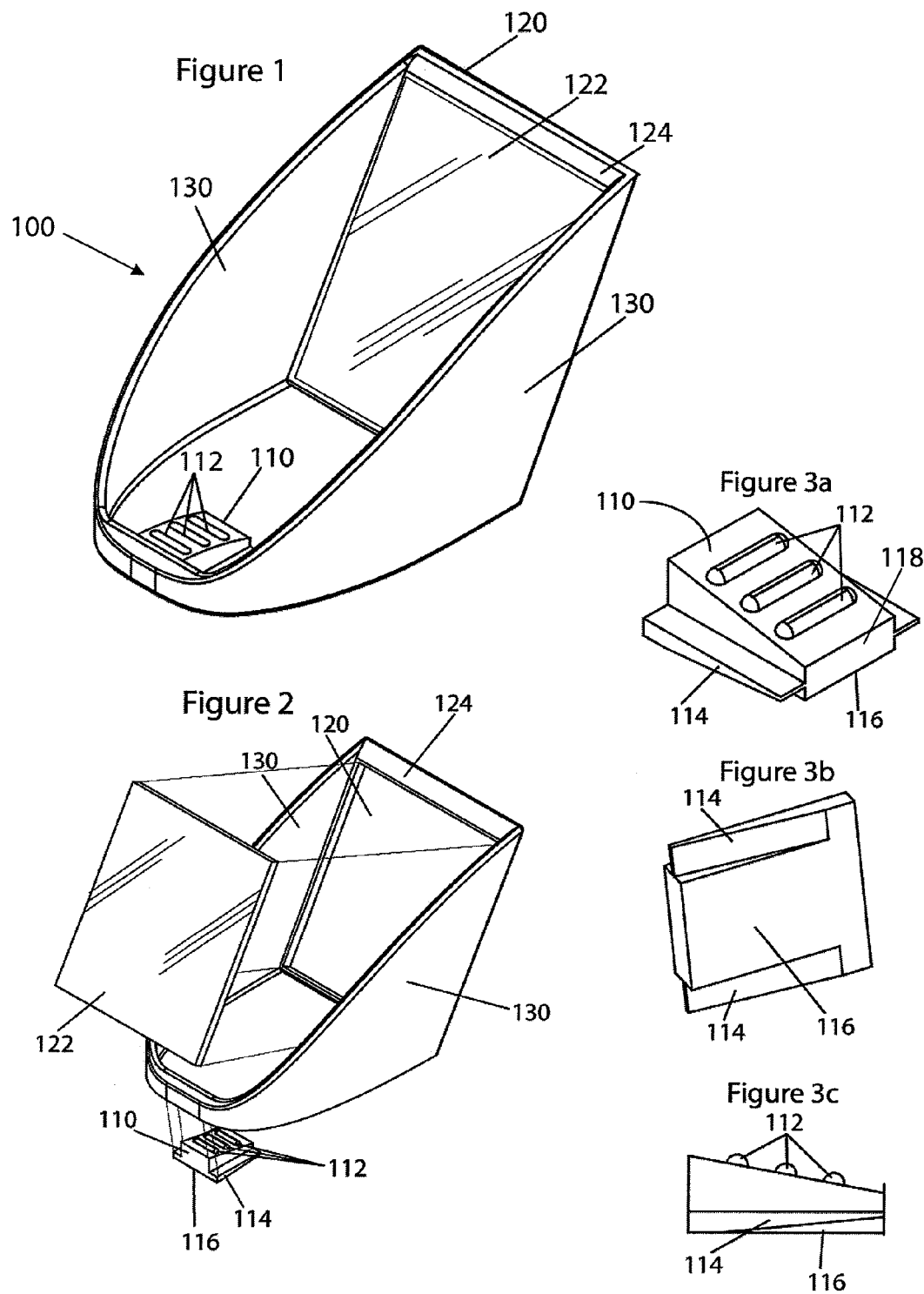

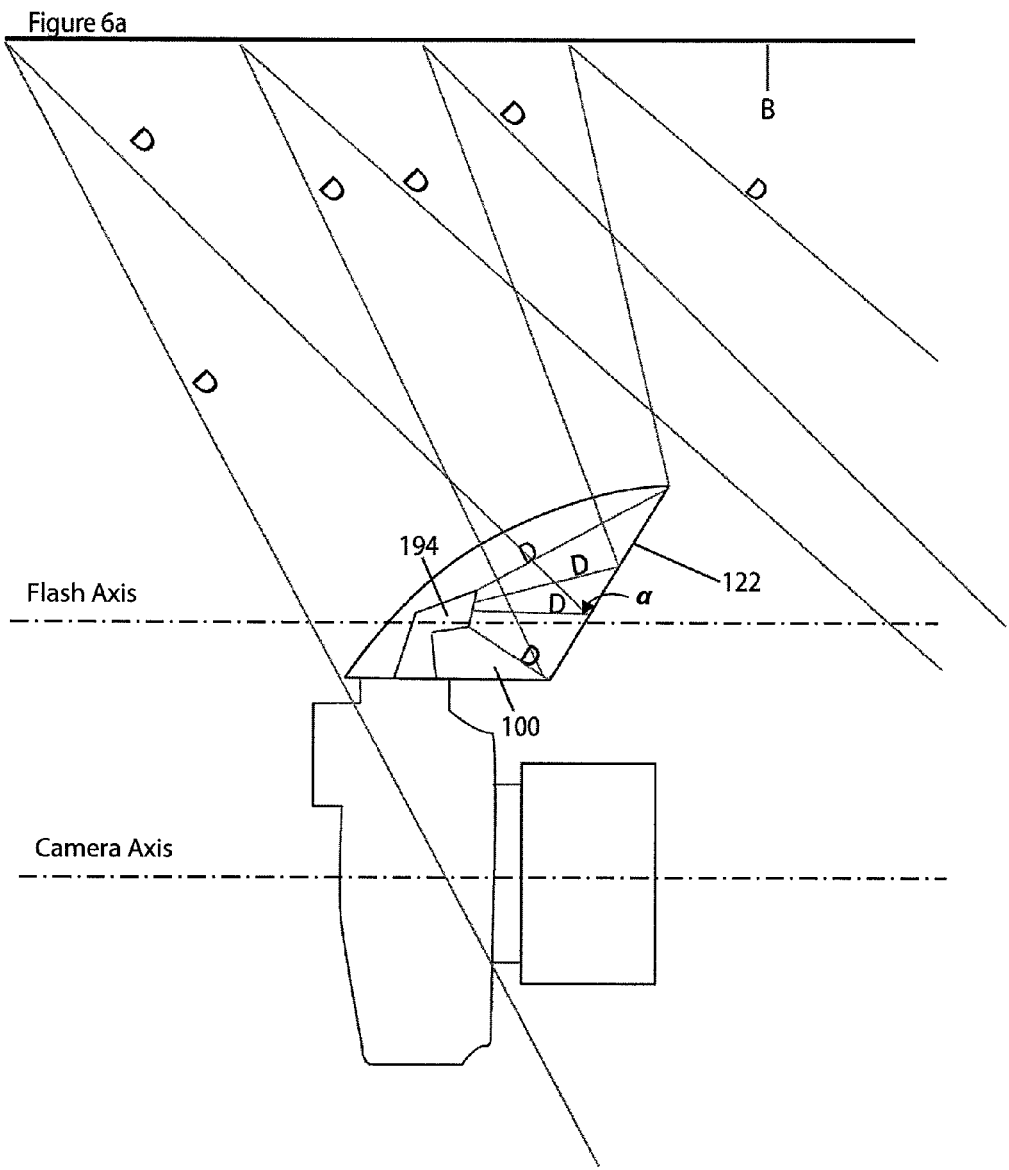

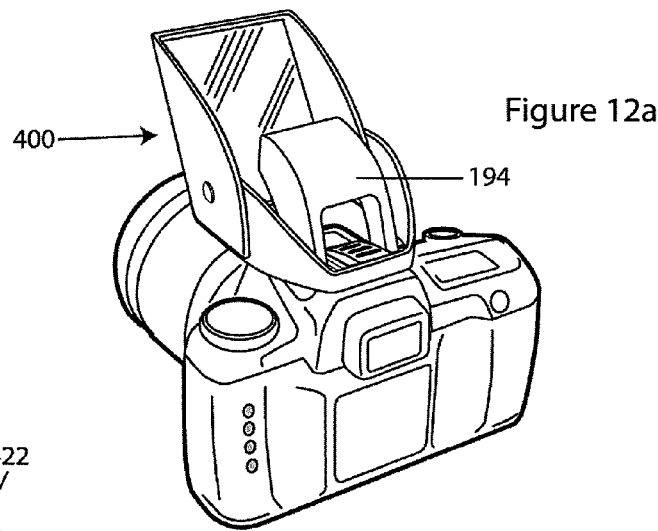
Figure 12a
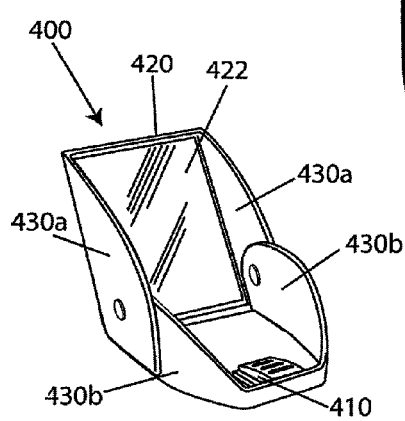
Figure 12b
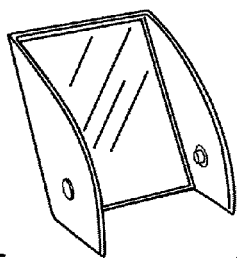
Figure 12c
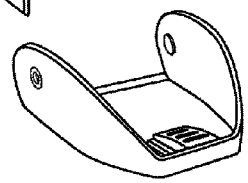
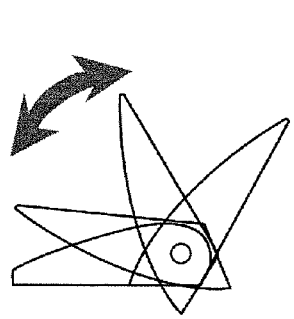
Figure 12d
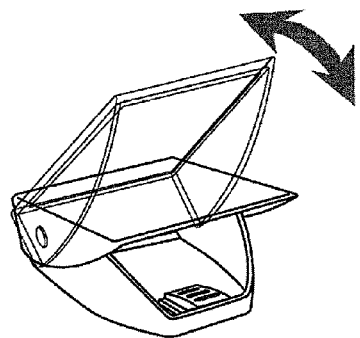
Figure 12e

DEVICE FOR REDIRECTING AND REFLECTING LIGHT FROM CAMERA FLASH AND METHODS FOR USING SAME

This application claims priority to and the benefit of U.S. Provisional Application No. 60/898,570, entitled "REFLECTOR FOR REDIRECTING AND BOUNCING LIGHT FROM BUILT-IN FLASH UNIT," filed on Jan. 31, 2007, which is incorporated in its entirety in this document by reference.

FIELD OF THE INVENTION

Devices are provided for redirecting and/or reflecting light from a camera flash unit. More specifically, a device is provided for selectively mounting to a camera having a built-in flash, and reflecting light from the flash unit when a picture is taken.

BACKGROUND OF THE INVENTION

Over the past decade, camera technology has increased significantly, with much focus being placed on digital cameras. However, despite this technological development, certain drawbacks of cameras have yet to be solved.

Generally, all cameras with built-in flash units have one feature in common: they have a relatively small flash unit located generally in the front of the camera. Conventionally, when the shutter is activated to take a picture, the flash unit sends out a direct light flash when an in-camera sensor determines that a scene has insufficient light to make a correctly exposed picture. The user can often manually turn this flash unit on and off.

A persistent problem with conventional built-in flash units is its location and size. For at least the following reasons, the flash generally produces a poor quality picture under many circumstances. First, the light from the camera's flash unit comes from just above the lens. When the photographer holds the camera at eye level, the flash emits light from a place just in front of the photographer's forehead, which is not a normal light emanating location. Thus, the flash unit produces an unnaturally lighted photograph.

Second, the light source for the built-in flash is small in size, usually less than two square centimeters. In the natural world, light sources are generally much larger, such as light from the sky, a window, lights on the ceiling of a room, or light from a table lamp. The small size of the flash inadequately covers the entire view of wide-angle lenses. The flash is often partially blocked by a large lens, leaving an unwanted shadow of the lens in a picture's foreground. Thus, built-in flash units generally inadequately light the desired subject matter of the photograph.

Third, the proximity of the built-in flash to the lens often produces a red-eye effect, which is well-known to many amateur and professional photographers, when a human or animal subject is looking directly at the camera. This proximity to the lens also produces pictures with unwanted reflections off of shiny surfaces.

Finally, because of the small size of the face of the strobe, the camera's built-in flash produces harsh shadows behind the subject. The flash also unevenly illuminates subjects that are not at the same distance from the camera; with subjects in the foreground generally receiving too much light and those in the background not getting enough illumination.

Many of the problems described above are not limited to cameras with built-in flash units. Rather, they apply equally to cameras having mountable or attachable flash units.

Thus, there is a need in the art for devices and methods for avoiding the problems commonly associated with camera flashes and producing photographs having natural illumination.

SUMMARY OF THE INVENTION

In accordance with the purposes of this invention, as embodied and broadly described herein, this invention, in one aspect, relates to devices for redirecting and/or reflecting light from a camera's built-in flash unit. In one aspect, the device includes a reflector member, at least a portion of which is reflective. The device can further include a connecting member having a proximal end portion configured for releasable mounting to a portion of the camera and an opposing distal end portion connected to the reflector member. When the device is operatively attached to the camera, the reflector member is spaced from and opposes the flash. The reflective portion of the reflector member is sized and shaped to receive and reflect substantially all light produced from the flash.

In accordance with another aspect, the device has a reflector member, at least a portion of which is reflective. The device also has a pair of opposing side walls that have respective proximal end portions connected to a foot member configured for releasable mounting therein a portion of the camera. The side walls also have respective distal end portions that are connected to opposing sides of the reflector member. When the device is operatively attached to a camera, the reflector member is spaced from and opposes the flash, and the reflective portion is sized and shaped to receive and reflect substantially all light produced from the flash. In a further aspect, the camera's flash has a respective flash axis. The reflective portion of the reflector member can be positioned at a predetermined or operatively selected angle relative to the flash axis.

According to yet another aspect, a device is provided that has a reflector member, at least a portion of which is reflective, and a connecting arm. The connecting arm has a proximal end portion that includes a foot member configured for releasable mounting therein a portion of the camera. The connecting member also has a distal end portion connected to the reflector member. When the device is operatively attached to the camera, the reflector member is spaced from and opposes the flash and the reflective portion is sized and shaped to receive and reflect substantially all light produced from the flash. According to a further aspect, the reflector member can be rotatably attached to the distal end portion of the connecting arm such that the reflective portion of the reflector member can be positioned at an operatively selected angle relative to a flash axis of the built-in flash.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this specification, illustrate several aspects of the invention and together with the description, serve to explain the principles of the invention.

FIG. 1 shows a perspective view of a device for redirecting light from a camera's built-in flash unit, in accordance with one aspect of the present invention.

FIG. 2 shows an exploded view of the device of FIG. 1.

FIG. 3a is a top, side perspective view of a foot member of the device of FIG. 1, in accordance with another aspect of the present invention.

FIG. 3b is a bottom, side perspective view of the foot member of FIG. 3a.

FIG. 3c is a side elevational view of the foot member of FIG. 3a.

FIG. 6a illustrates the reflection of light from a camera's flash unit off of the device of FIG. 1.

FIG. 9e is a perspective view illustrating an exemplary reflection of light from a camera's flash unit off of the device of FIG. 9a.

FIG. 10e is a perspective view illustrating the reflection of light from a camera's flash unit off of the device of FIG. 10a.

FIG. 11b is a perspective view of the device of FIG. 11a.

FIG. 12a is a perspective view of a device for redirecting light from a camera's built-in flash unit and attached to a camera, according to yet another aspect of the present invention.

FIG. 12b is a perspective view of the device of FIG. 12a.

FIG. 12c is an exploded view of the device of FIG. 12a.

FIG. 12d is a side elevational view of the device of FIG. 12a illustrating the collapsibility of the reflector member.

FIG. 12e is a perspective view of the device of FIG. 12a illustrating the collapsibility of the reflector member.

FIG. 13b is an alternate perspective view of the device of FIG. 13a.

FIG. 13c illustrates various perspective views of the device of FIG. 13a.

FIG. 13e is an enlarged close-up view of the device of FIG. 13a mounted to a camera's built-in flash unit.

FIG. 14b is an alternate top perspective view of the foot member of FIG. 14a.

FIG. 14c is a bottom perspective view of the foot member of FIG. 14a.

FIG. 14d is a bottom perspective view of the foot member of FIG. 14a.

DETAILED DESCRIPTION OF THE INVENTION

Figure 4:
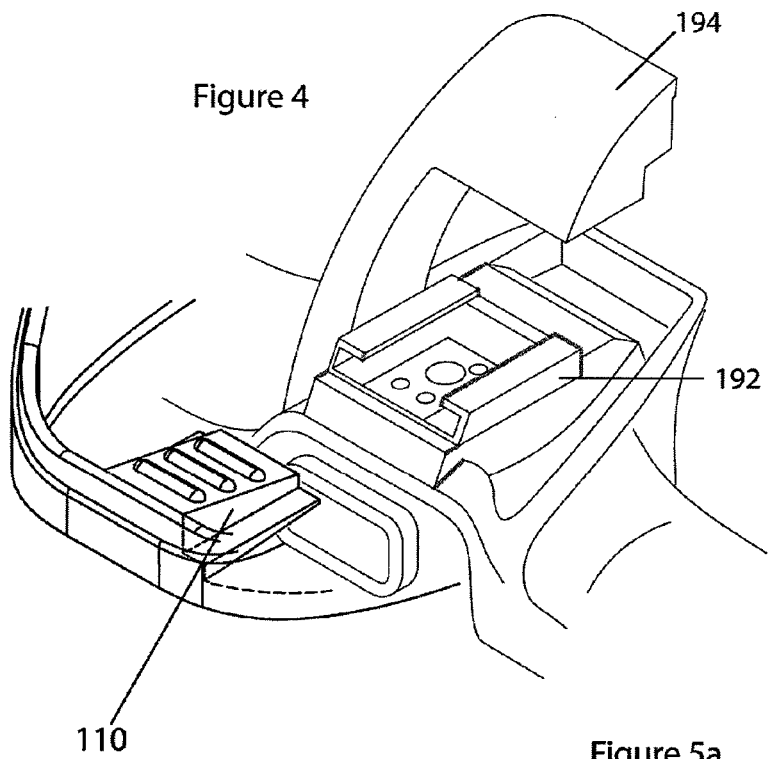
FIG. 4 is a partial perspective view illustrating the insertion of a foot member of the device of FIG. 1 into the camera's hot shoe, in accordance with yet another aspect of the present invention.

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "reflective surface" can include two or more such reflective surfaces unless the context indicates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Reference will now be made in detail to the present preferred aspects of the invention, examples of which are illustrated in the accompanying drawings. Wherever possible, the same reference numbers are used throughout the drawings to refer to the same or like parts.

According to various aspects of the present invention, a device is provided for use with a camera having a built-in flash. As may be appreciated, the built-in flash can be a pop-up flash that extends outwardly from a portion of the camera body, such as the flash 194 shown in FIGS. 4 and 5. Optionally, the built-in flash can be fully integrated, or partially integrated, with the camera body, such as the integrated built-in flash 294 shown in FIG. 8*b*. The camera generally has an operating axis, which can be defined by the central axis of the lens of the camera. Thus, the operating axis generally extends from the lens to the subject of the photograph. The flash has a respective flash axis, which is substantially parallel to the operating axis of the camera and along which at least some of the light from the flash is directed. The camera operating axis and flash axis are illustrated by the dashed lines of FIG. 6*a*. The camera also comprises a hot shoe 192, as are known in the art.

According to one aspect, the device is provided for redirecting or reflecting light produced from a camera's flash unit. As can be seen in FIGS. 1 and 2, an exemplary device 100 can comprise a reflector member 120. In one aspect, the reflector member comprises a substantially planar surface, at least a portion of which can be reflective. For example, a reflective surface 122 can be provided that covers substantially all of the reflector member. Optionally, the reflective surface can cover a lesser portion of the planar surface of the reflector member. The reflective surface, in one aspect, comprises a mirror. The mirror, in one aspect, can be tinted to provide for different photographic effects. For example, a gold-tinted mirror can be provided to create photographs having a warmer appearance. Optionally, the reflective surface can comprise a reflective film such as Mylar®. In yet another aspect, the reflective surface can comprise any reflective material that can be glued, snapped, applied, or otherwise attached to or integrated with the reflector member.

The device, according to further aspects, comprises a connecting member having a proximal end portion and an opposed distal end portion. The proximal end portion can be releasably mounted to a portion of the camera, and the distal end portion can be connected to the reflector member. For example, as illustrated in FIG. 1, the connecting member can comprise a pair of opposing side walls 130. As shown, the distal end portions of the side walls are connected to respective opposing side edges of the reflector member. Thus, the distal end portions of the side walls are spaced apart at a predetermined distance that is substantially equal to the width of the reflector member. The proximal end portions of the side walls can be spaced together at a distance less than that of the proximal end portions. Optionally, the proximal end portions of the side walls can connect to form a substantially continuous side wall. In one aspect, all or a portion of each of the side walls' interior surface can be a reflective surface to provide for additional reflection of the light emitted from the flash unit.

As can be seen in FIG. 1, the reflector member and side walls define a cavity having an open upper portion and lower portion. As will be described below, the open upper portion allows light emitted from the flash to be reflected from the reflective surface 122 of the reflector member and away from the camera and the open lower portion allows the device to be attached to a camera by allowing the flash to be inserted therein the cavity.

Figure 5A:
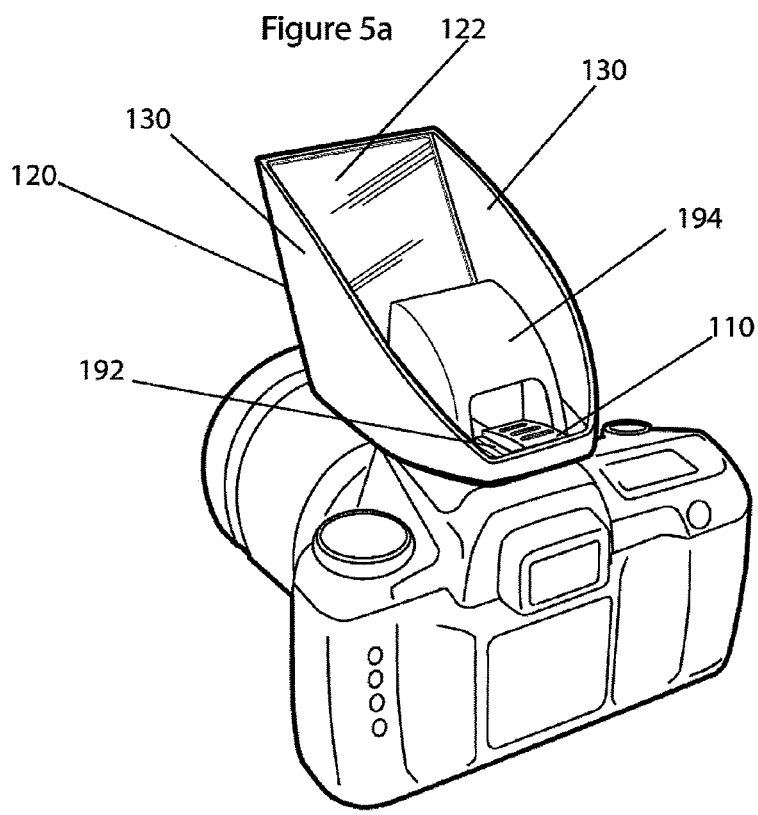
FIG. 5a shows the device of FIG. 1 attached to a camera with a top-mounted built-in flash.

A foot member 110 can be provided that is attached to or integrally formed with the proximal end portions of the side walls. The foot member is configured for selective mounting to the camera hot shoe 192. An exemplary foot member 110 is illustrated in FIGS. 3*a*-3*c*. As can be seen, in one aspect, the foot member has a body portion having a sloped upper surface that slopes downward toward a leading edge 118 of the foot member such that the height of the foot member is smaller at the leading edge than at the opposing trailing edge. On the upper surface can be provided one or more grip ridges 112 for a user to grip when selectively attaching or detaching the device from the camera hot shoe. Although shown in FIG. 3*a* as comprising three grip ridges, it is contemplated that the foot member can comprise any number of grip ridges, or can comprise no grip ridges. The foot member further includes at least one rail positioned on the side of the body of the foot member. As shown in FIG. 3*a*, in one aspect, the foot member comprises a pair of rails 114 positioned on either side of the body. In one aspect, the rails taper toward the leading edge 118 of the foot member. As illustrated in FIG. 4, the tapered rail(s) can be sized and shaped to be received by corresponding slots in the hot shoe 192 of the camera. As will be described further below, the foot member is configured to be inserted therein the hot shoe of the camera to allow for operative use of the device. In one aspect, the foot member can be retained therein the hot shoe by friction fit.

FIGS. 14*a*-14*d* illustrates another exemplary foot member, according to one aspect of the present invention. The foot member 610 has a body portion having a sloped upper surface that slopes toward a leading edge 618 of the foot member, such that the height of the foot member is less at the leading edge than at the opposing trailing edge. As described above, the upper surface of the foot member can include one or more grip ridges 612 for a user to grip when selectively attaching or detaching the device from a camera hot shoe. The foot member can include rails 614 positioned on either side of the body, which can be configured for insertion therein respective slots of a hot shoe. The trailing portions of the rails can respectively comprise a stopper 615 that is configured to prevent the foot member from being inserted beyond a certain point in the hot shoe and to prevent forward movement of the device after it has been operatively attached to the camera. Optionally, the rails can be tapered, such as described above, to prevent insertion into the hot shoe beyond a predetermined point. In a particular aspect, the foot member can include one or more slots 619 that extend therethrough the body of the foot member from the upper surface to the lower surface 616. It is contemplated that such slots can increase the flexibility of the foot member.

Figure 5B:
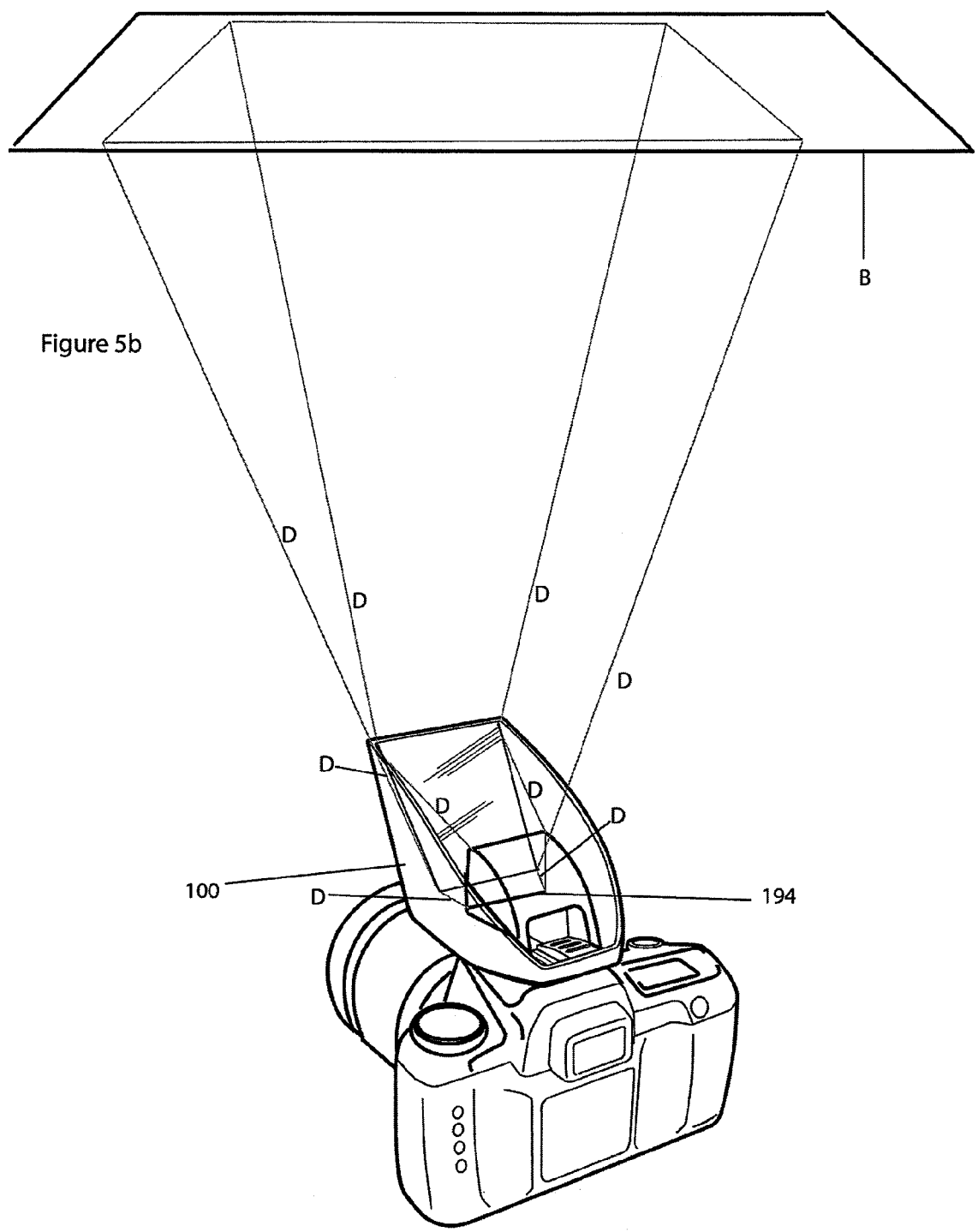
FIG. 5b illustrates the reflection of light from a camera's flash unit off of the device of FIG. 1.
Figure 6B:
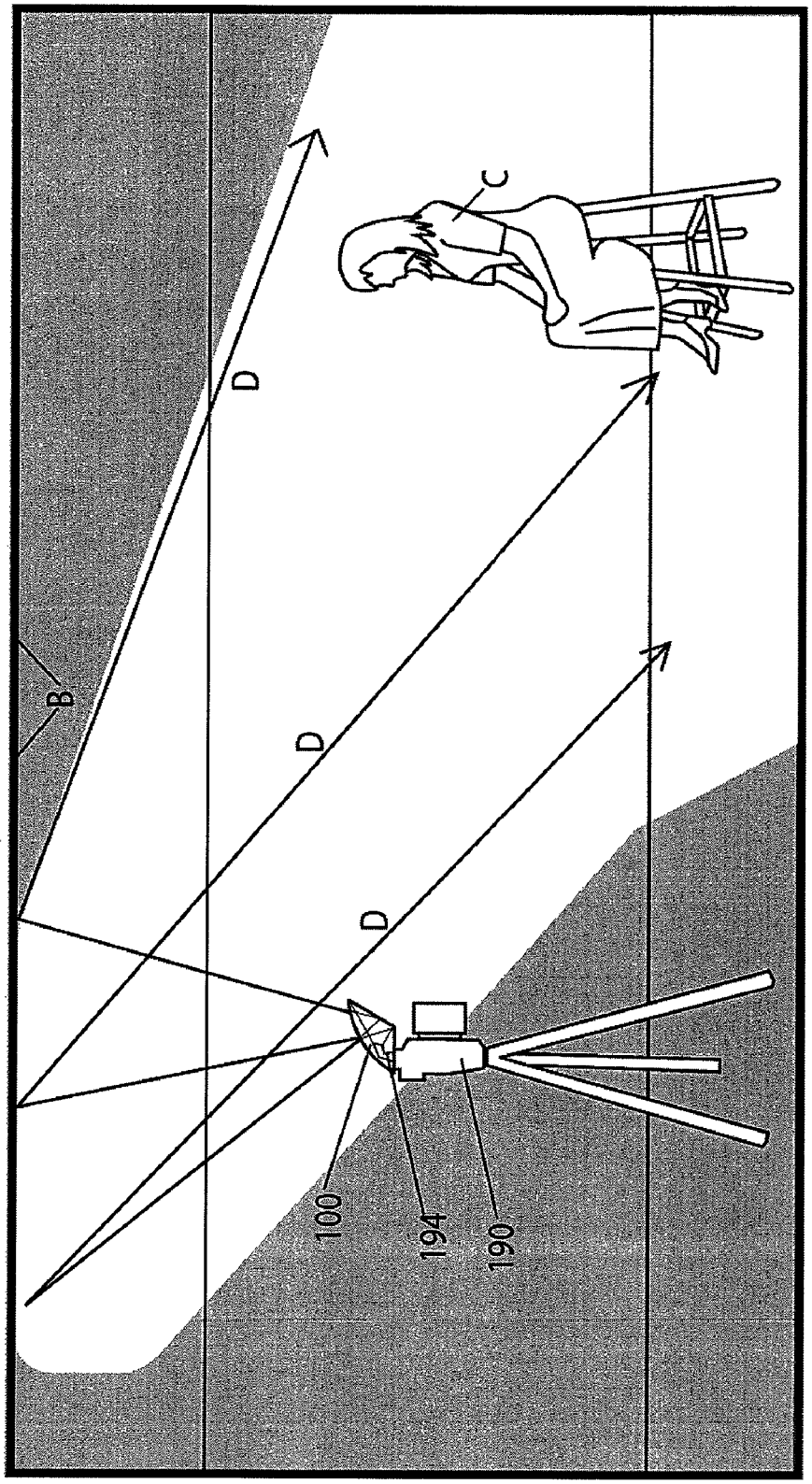
FIG. 6b illustrates the reflection of light from a camera's flash unit off of the device of FIG. 1.

According to various aspects of the present invention, when the device is operatively connected to the camera, the reflector member is spaced from and opposes the flash. The reflector member, in one aspect, is positioned at an angle relative to the flash axis, designated by α in FIG. 6*a*. The angle can be, for example, obtuse. In a particular aspect, the angle is from about 115 to about 120 degrees, such as 115.0, 115.5, 116.0, 116.5, 117.0, 117.5, 118.0, 118.5, 119.0, 119.5, and 120.0 degrees. In yet a further aspect, the angle is approximately 118 degrees. As illustrated in FIGS. 5*b*, 6*a* and 6*b*, the reflector member can be configured to a predetermined angle, such as but not limited to those described above, so as to redirect or reflect light produced from the flash away from the camera. As shown in these figures, light emitted from the flash 194 (represented by light rays "D") is directed toward the reflector member and is reflected off of the reflective surface 122. In one aspect, the device 100 can be positioned to reflect the light substantially upward, such as toward a ceiling (represented by "B" in FIGS. 5*b*, 6*a* and 6*b*). As can be seen, the light D can then be reflected from the ceiling, or other surface, and directed toward a subject (represented by "C" in FIG. 6*b*).

Figure 8A:
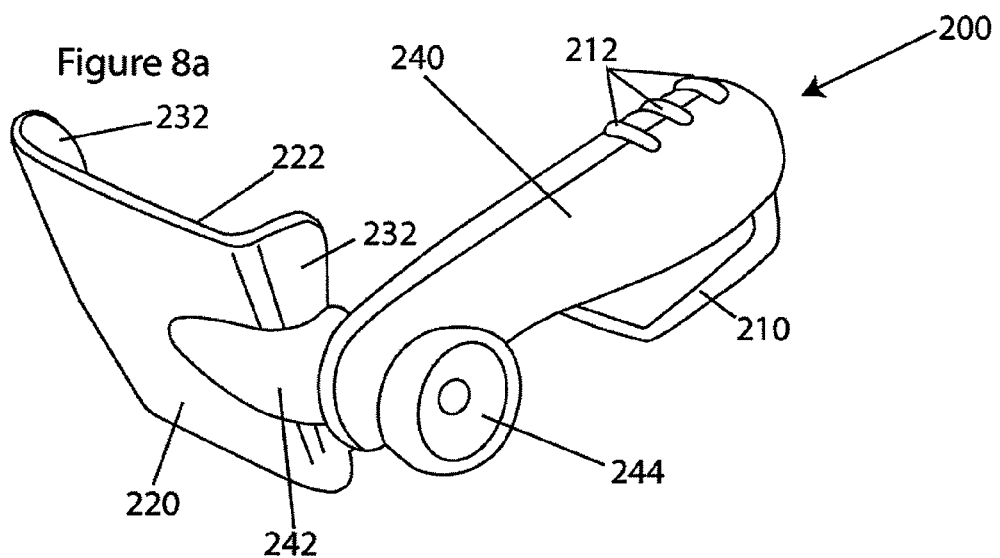
FIG. 8a is a perspective view of a device for redirecting light from a camera's built-in flash unit, according to yet another aspect of the present invention.
Figure 8B:
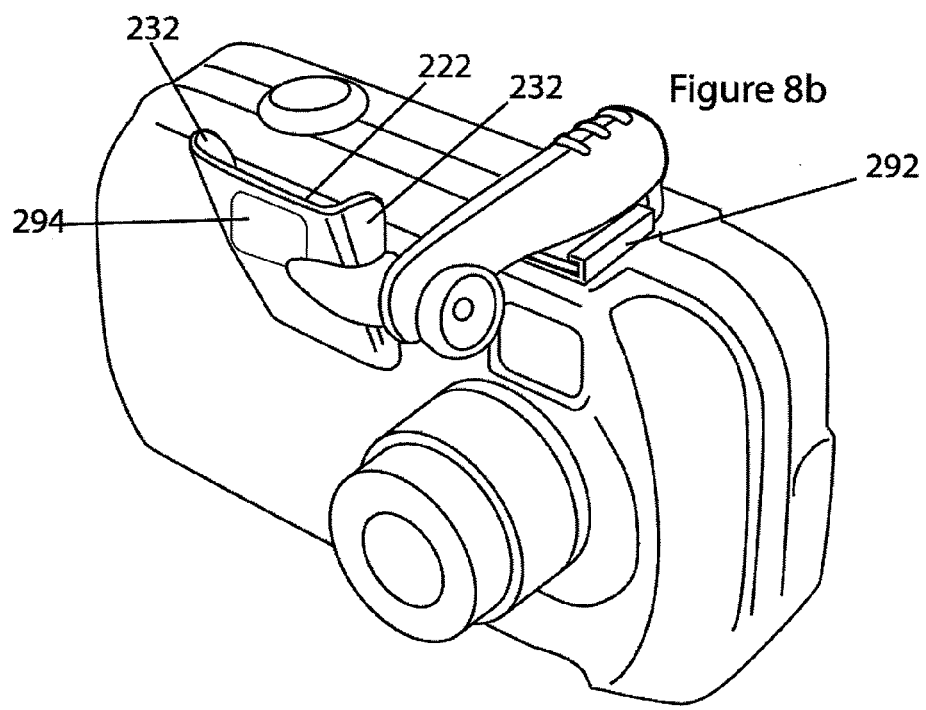
FIG. 8b illustrates the device for redirecting light of FIG. 8a attached to a camera's hot shoe, according to one aspect of the present invention.

According to another aspect of the present invention, a device 200 is provided that has a reflector member 220, which has a substantially planar surface, at least a portion of which is a reflective surface 222, such as illustrated in FIGS. 8*a* and 8*b*. A connecting member 240 is provided having a proximal end portion and an opposed distal end portion. In one aspect, the connecting member is an elongate arm 240. The distal end portion of the elongate arm is connected to a foot member 210 that is configured for selectively mounting therein the hot shoe 292 of a camera, such as illustrated in FIG. 8b. The foot member can comprise tapered rails, such as those described above, that are configured for slidable insertion therein respective slots of the foot member. The foot member can be attached to an underside of the elongate arm. In one aspect, one or more grip ridges 212 can be provided on the opposing upper side of the elongate arm to facilitate the user in attaching or detaching the device from the camera. Although shown in FIGS. 8a and 8b as being used with a camera having an integrated built-in flash unit 294, it is contemplated that such a device 200 can be used with cameras having pop-up flash units, or partially integrated flash units.

The proximal end portion of the elongate arm 240 comprises a rotating joint member 242. The rotating joint member comprises a shaft portion that extends through the proximal end portion of the elongate arm. A tightening knob 244 is provided at the end of the shaft portion of the rotating joint member. The rotating joint member 242 is attached to the reflector member at the opposing end of the shaft. The reflector member thus can be rotated to a desired angle, and the tightening knob can be adjusted to maintain the reflector member at the desired angle. In a further aspect, the reflector member 220 has two side walls 232 that extend from opposing side edges of the reflector member. When the device is operatively connected to the camera, the side walls extend toward the camera. In one aspect, the interior surfaces of the side walls can be entirely or partially reflective.

Figure 9A:
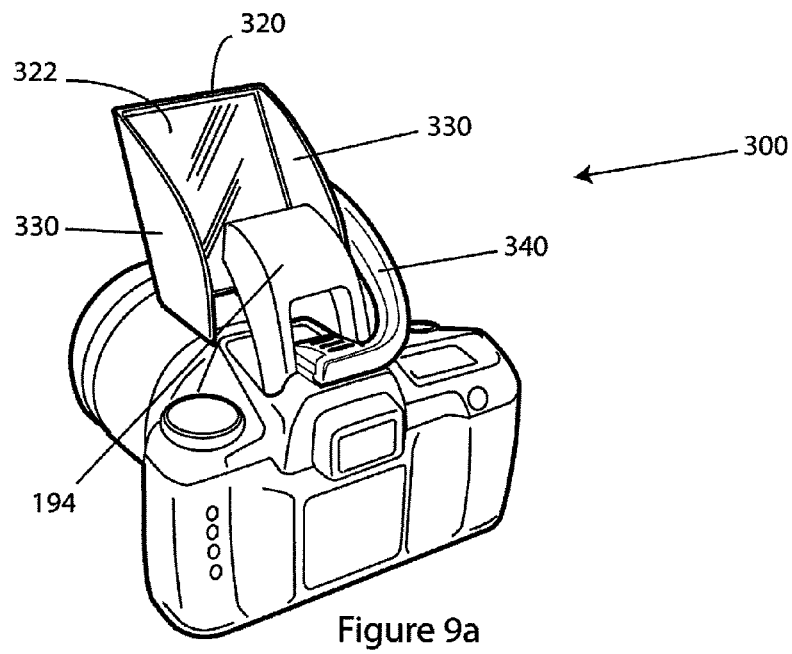
FIG. 9a is a rear perspective view of a device for redirecting light from a camera's built-in flash unit having a rotatable reflector member and attached to a camera, according to yet another aspect of the present invention.
Figure 9B:
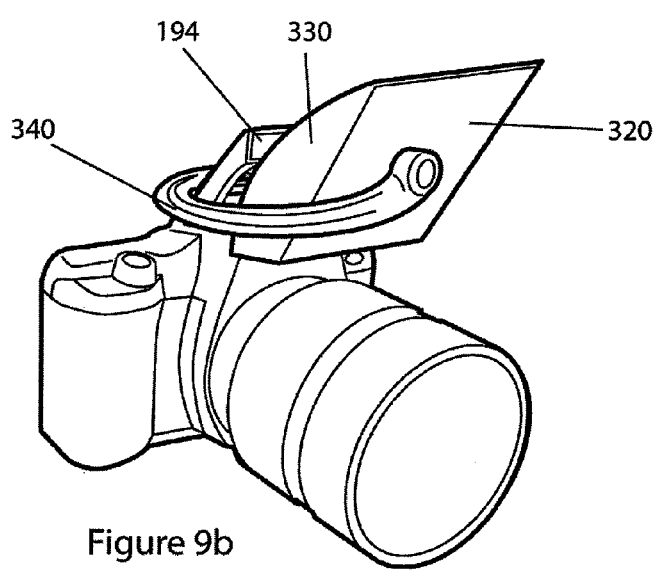
FIG. 9b is a front perspective view of the device of FIG. 9a attached to a camera.
Figure 9C:
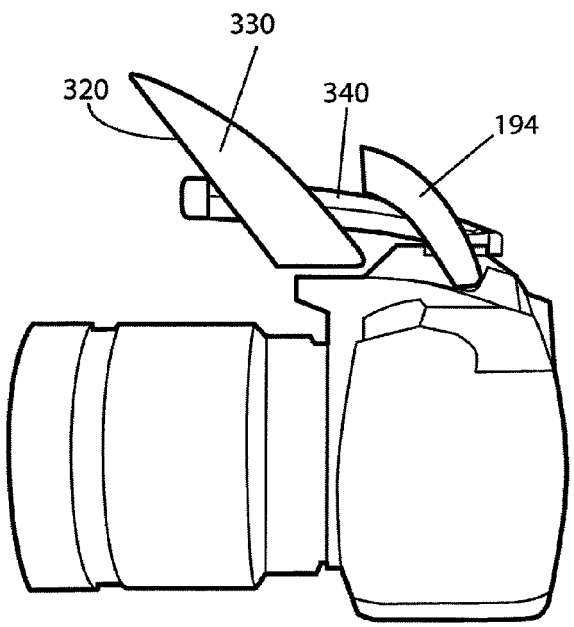
FIG. 9c is a side elevational view of the device of FIG. 9a attached to a camera.
Figure 9D:
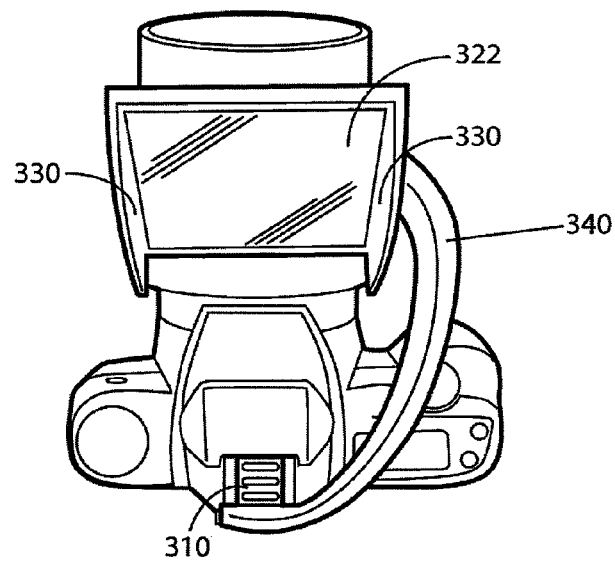
FIG. 9d is a top plan view of the device of FIG. 9a attached to a camera.
Figure 9E:
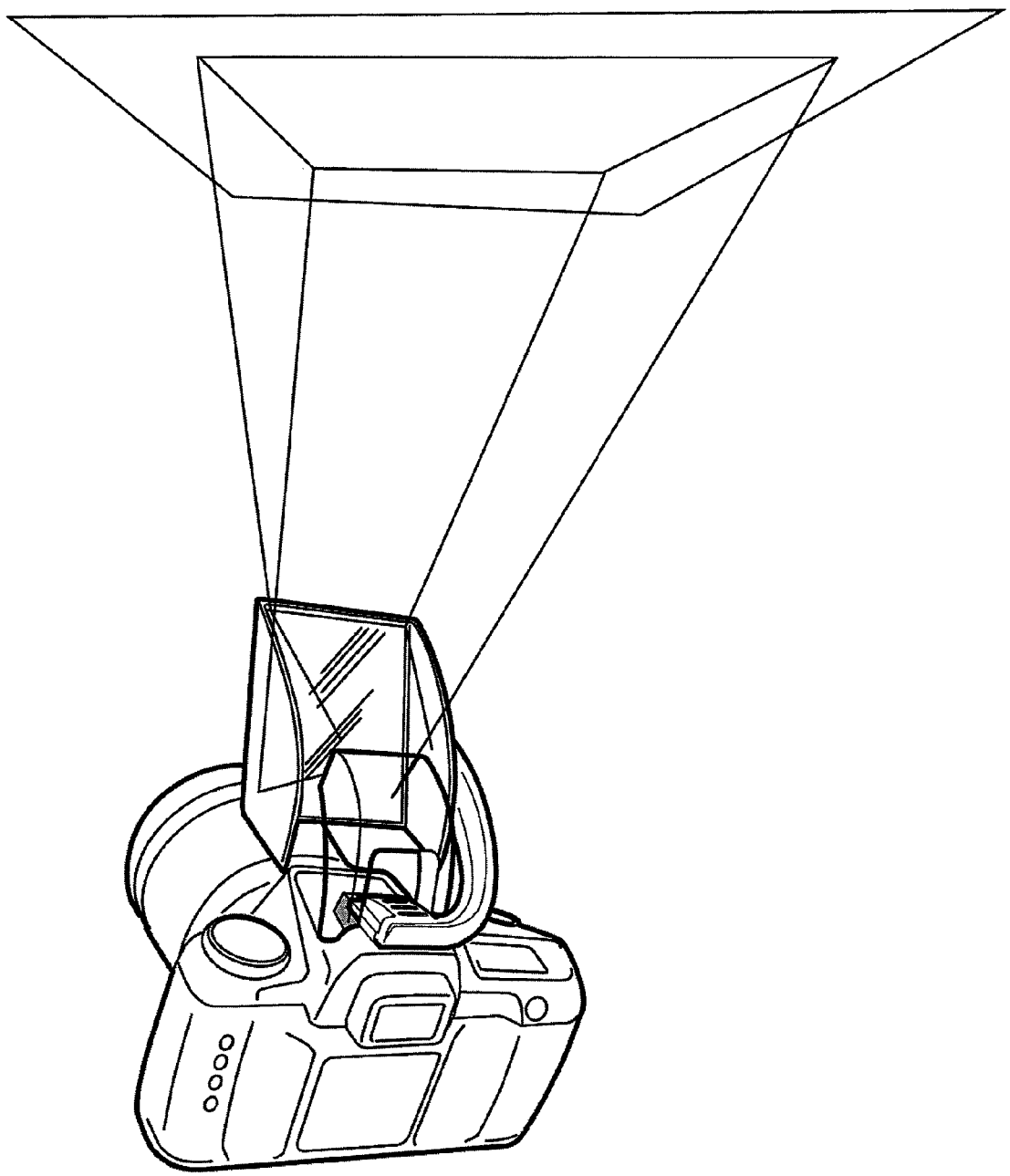
Figure 10A:
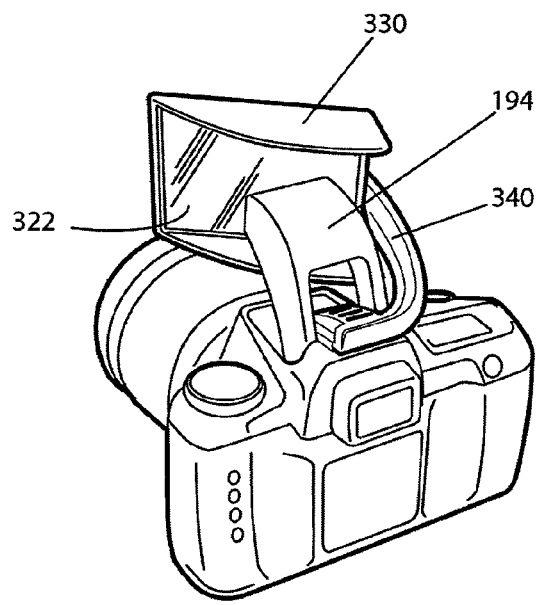
FIG. 10a is a rear perspective view of the device of FIG. 9a attached to a camera selectively oriented on an alternative axis.
Figure 10B:
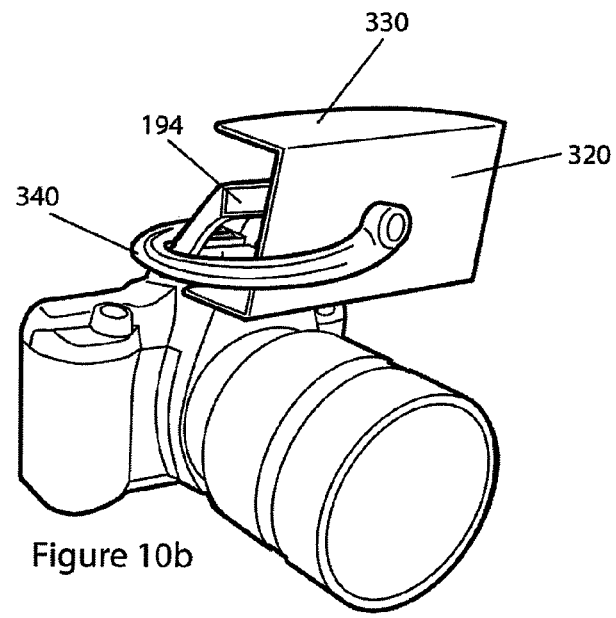
FIG. 10b is a front perspective view of the device of FIG. 10a attached to a camera.
Figure 10C:
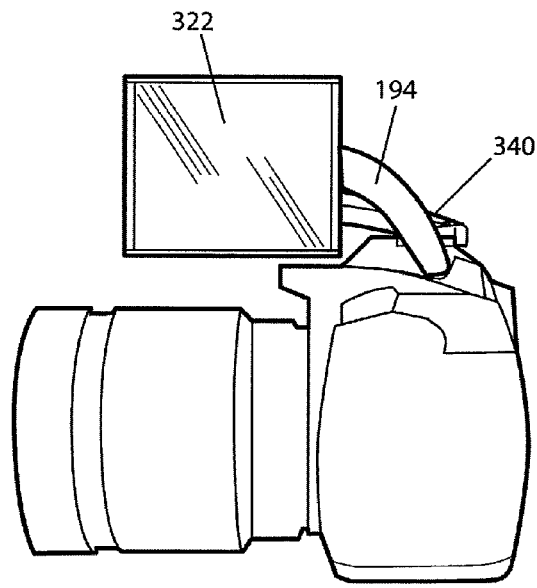
FIG. 10c is a side elevational view of the device of FIG. 10a attached to a camera.
Figure 10D:
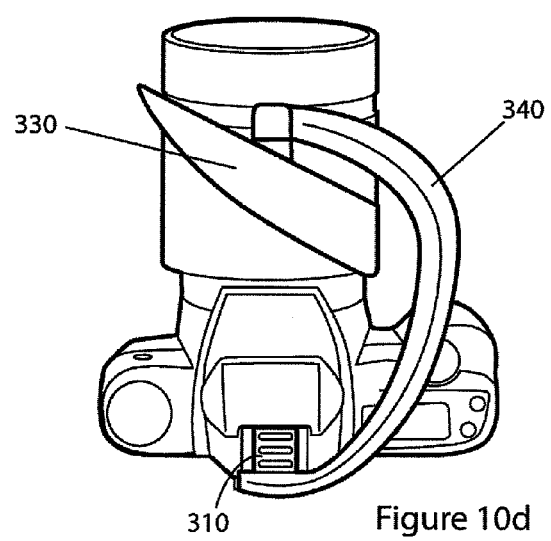
FIG. 10d is a top plan view of the device of FIG. 10a attached to a camera.
Figure 10E:
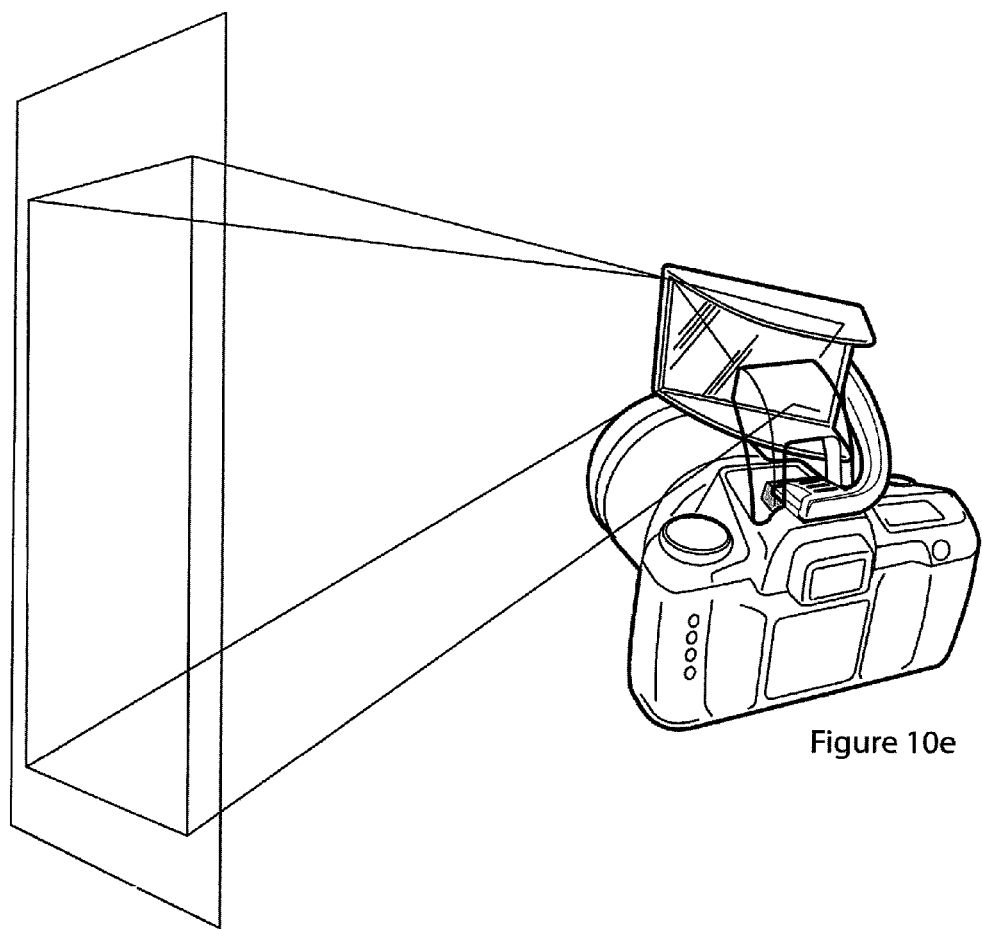

According to yet another aspect of the present invention, a device 300 is provided that comprises a reflector member 320 having a substantially planar surface, at least a portion of which is a reflective surface 322. As illustrated in FIGS. 9a and 9b, in one aspect, the device has a connecting member 340. The connector member has a distal end portion that is attached to the reflector member. The connecting member has an opposing proximal end portion that is configured for releasable mounting to the camera. For example, the proximal end portion can be integrally formed with a foot member 310 configured to selectively mount therein the hot shoe of the camera. The distal end portion is rotatably mounted to a rear surface of the reflector member, thus providing a point of rotation 346 for the reflector member.

Figure 11A:
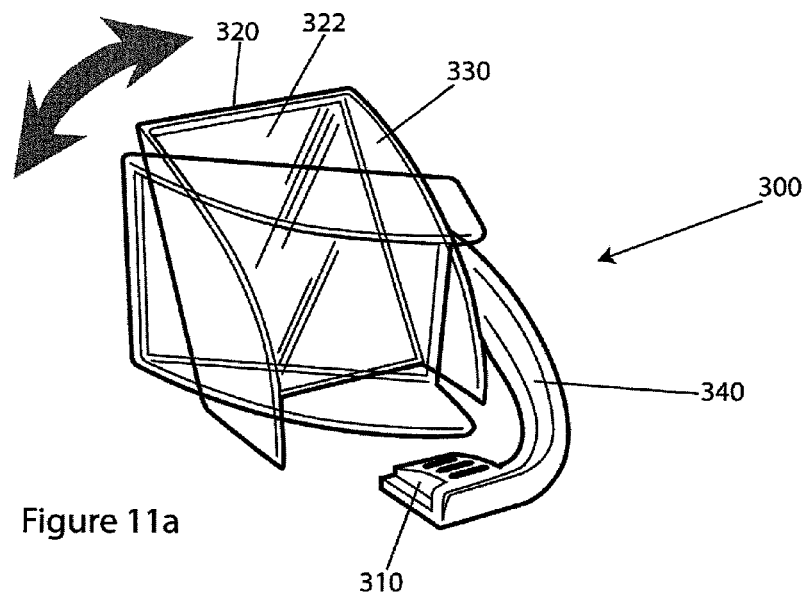
FIG. 11a is a perspective view of a device for redirecting light from a camera's built-in flash unit having a rotatable reflector member, according to one aspect of the present invention.
Figure 11B:
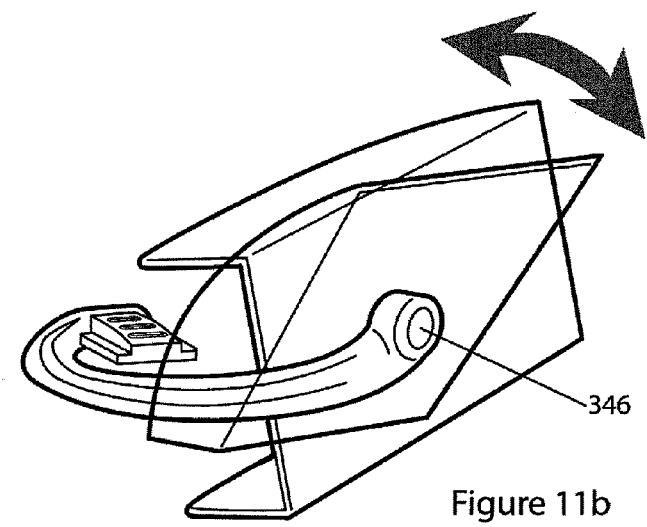

As described above, the reflector member can be positioned at a predetermined angle with respect to the flash axis. Through the rotatable mounting to the connecting member 340, the reflector member can be rotated to maintain the predetermined angle, while reflecting or redirecting the light in various directions. For example, as shown in FIGS. 9a through 9e, the reflector member can be positioned to reflect light emitted from the flash upward, such as toward a ceiling in a room in which the photograph is taken. Optionally, as shown in FIGS. 10a through 10e, the reflector member can be rotated to reflect the light toward the side, such as toward a wall in a room in which the photograph is taken. In one aspect, the reflector member can be rotated to various positions to reflect the light in a user selected direction. FIGS. 11a and 11b illustrate this exemplary positioning.

According to yet another aspect of the present invention, a device 400 is provided having a reflector member 420 and a connecting member. As described above with respect to FIG. 1, the reflector member can be substantially planar and can have a reflective surface portion 422. As shown in FIGS. 12a through 12e, the connecting member comprises a pair of opposing side walls 430, distal portions of which are connected to respective opposing side edges of the reflector member. A foot member 410 is provided between and attached to proximal end portions of the side walls.

As shown in FIG. 12c, each side wall comprises two side wall members that are rotatably connected to each other. As shown in FIGS. 12d and 12e, the side wall members of each side wall can be rotated relative to each other such that the reflector member can be collapsed toward the foot member. Thus, the device can be folded or collapsed to provide for easier storage or portability.

Figure 13A:
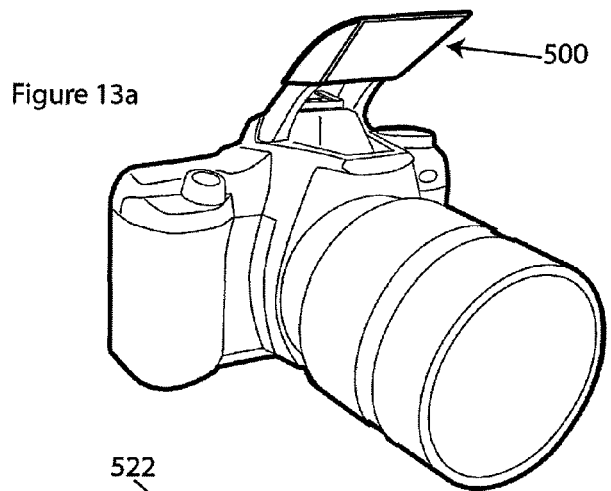
FIG. 13a is a perspective view of a device for redirecting light from a camera's built-in flash unit and mounted to the flash unit, according to one aspect of the present invention.
Figure 13B:
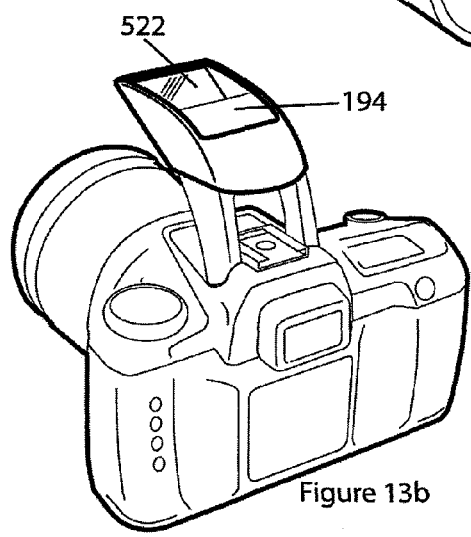
Figure 13C:
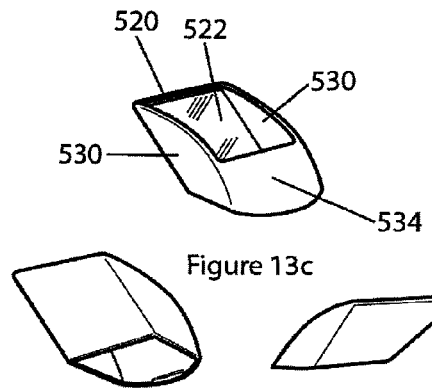
Figure 13D:
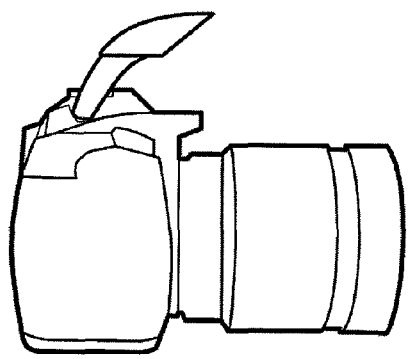
Figure 13E:
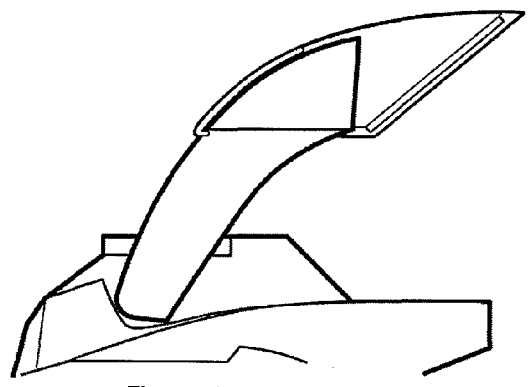
FIG. 13e is a side elevational view of the device of FIG. 13a mounted to a camera's built-in flash unit.
Figure 14A:
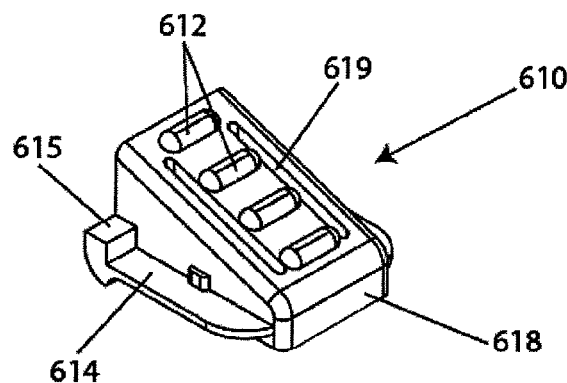
FIG. 14a is a top perspective view of a foot member, according to one aspect of the present invention.
Figure 14B:
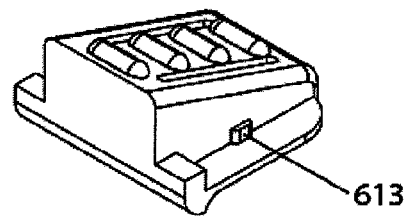
Figure 14C:
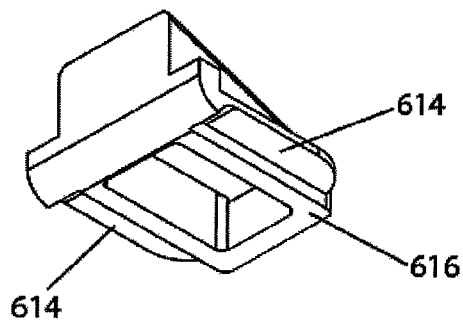
Figure 14D:
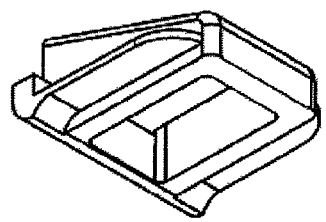

A device is provided, as shown in FIGS. 13a through 13e, that is configured for direct attachment to the built-in flash of a camera, according to yet another aspect of the present invention. The device 500 comprises a reflector member 520 having a substantially planar surface, at least a portion of which is a reflective surface 522. The device has a connecting member for releasably mounting the device to a portion of the camera. For example, as shown in FIG. 13c, the device has a pair of opposing side walls 530 that are attached at their distal ends to respective opposing side edges of the reflector member. The proximal ends of the side walls are attached to a front wall 534, which is spaced from and opposes the reflector member. The reflector member, side walls, and front wall collectively define an internal cavity having an open upper portion and open lower portion. The open lower portion allows the device to be inserted onto the flash unit and the open top allows light to be reflected from the reflective surface away from the flash.

As illustrated in the figures, the device can be sized and shaped to slip onto a camera's built-in flash 194. In a particular aspect, the device is retained by a snap fit with the flash unit. Thus, it is contemplated that the device can be sized and shaped to fit various models of cameras having different flash units. When operatively attached to the flash unit, the reflective surface 522 of the reflector member 520 opposes the flash. The reflector member is positioned at an angle relative to the flash axis such that at least some of the light emitted from the flash unit is reflected from the reflective surface upwardly away from the camera.

Figure 7A:
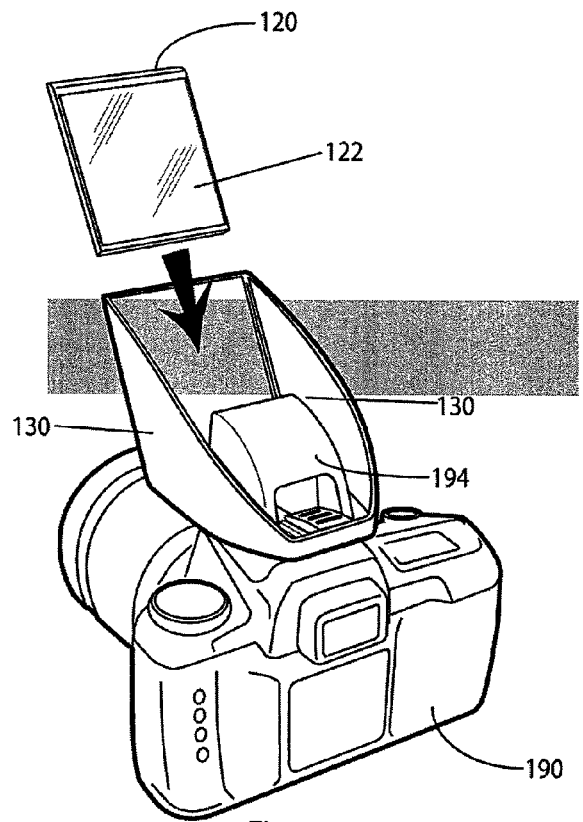
FIG. 7a illustrates the insertion of a reflective surface therein the device of FIG. 1.
Figure 7B:
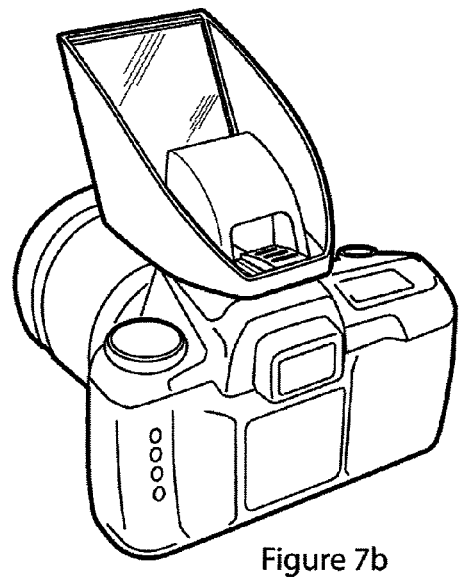
FIG. 7b illustrates the device of FIG. 1 after the reflector member is inserted therein.

Methods are provided for using devices, such as those described with regard to various aspects above, for redirecting or reflecting light emitted from a camera's built-in flash unit. For example, and without limitation, a device 100 such as illustrated in FIG. 1 can be used with a camera having a built-in pop-up flash unit 194. In one aspect, the reflective surface 122 can first be attached to the reflector member 120. The reflector member can comprise a lip or cornice 124 configured to retain the reflective surface therein the reflector member. The reflector member can be a mirror, reflective film, or other reflective film, that can be attached, snapped, glued, adhered, or otherwise affixed to the reflector member. It is contemplated that, in one aspect, the reflective surface can be selectively attached and detached, such as shown in FIG. 7a. For example, various reflective surfaces having different reflective properties can be provided that can be interchanged depending on the needs of the photographer. Optionally, the device can be provided with a reflective surface that is permanently affixed to the reflector member.

The device can then be positioned over the pop-up flash unit by inserting the flash unit into the open lower portion of the cavity formed by the reflector member 120 and side walls 130. As shown in FIG. 4, the foot member 110 can be inserted into the hot shoe 192 by inserting the tapered rails of the foot member into corresponding slots in the hot shoe. The foot member can be sized and shaped such that the foot member is retained therein the hot shoe by friction fit. It is contemplated that the foot member can be sized and shaped to be received by hot shoes of various camera models.

In one aspect, the device used can have the reflector member positioned at a fixed, predetermined angle, such as the device 100 of FIG. 1. Optionally, a device can allow the user to adjust the angle, such as the device 200 of FIG. 8*a* that has a reflector member rotatably coupled to the connecting arm 240. Thus, the photographer can adjust the angle as required by the particular photographic environment. In yet another aspect, the device used can have a connecting arm 340 that is rotatably connected to the back surface of the reflector member 320. Thus, the photographer can rotate the reflector member to reflect the light in a desired direction. For example, if the photographer desires to have the light reflected toward the ceiling, the photographer can rotate the reflector member to reflect the light upwards, regardless of whether the camera is held horizontally or vertically. Likewise, if the photographer desires to have the light reflected toward a wall, the photographer can rotate the reflector member to reflect the light sideways, regardless of whether the camera is held horizontally or vertically. In yet another aspect, a device 500 such as shown in FIGS. 13*a* through 13*e* can be inserted over the pop-up flash unit and retained by snap fit.

It is contemplated that the device, as described according to various aspects herein, can be made of various materials, including plastic, metal, or other suitable materials that can be used to form the device, or a combination thereof. Therefore, the device is not intended to be limited to any particular material and is intended to include any suitable materials as are known in the art.

When the device has been operatively attached to the camera, the photographer can initiate taking a photograph. As the flash emits light, it will be redirected from the reflector member of the respective device being used. For example, the light will reflect from the reflective surface of the device toward a ceiling or wall of the room in which the photograph is taken. Because light leaves the face of the flash in a widening cone, the resulting light pattern on the ceiling or wall (or other surface in the photographic environment) will be much larger than the original light source. The light that is then reflected off of the ceiling or wall thus emits from a new and larger area. The effectively larger light source will strike a subject from an angle other than the angle of the camera. For example, if light is reflected from the ceiling, it will reflect the light from a higher angle than the camera lens. If the light is reflected from a wall, the light will reflect from the side and illuminate the subject.

The larger effective light source, no coming from the ceiling or wall, will eliminate harsh shadows in the photograph. Additionally, the larger light source allows for various subjects in the photograph to be evenly illuminated. In traditional flash photography, subjects near the camera receive more light than subjects far from the camera. This can result in burned out foregrounds, or backgrounds that are too dark. Use of exemplary devices of the present invention allows all subjects in a photograph to be more evenly illuminated.

Additionally, when the device is used, the light illuminates the subject indirectly, rather than directly, causing light to enter a human or animal subject's pupils from above or to the side. In traditional flash photography, when light enters the subject's eyes directly, it reflects off of the retina and its blood-rich vessels and then back to the camera, resulting in a red-eye effect. By using the device, light does not enter the subject's eyes directly from the flash unit, thereby reducing or even eliminating the red-eye effect.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A device for use with a camera having a built-in flash having a flash axis that extends from the camera toward a subject, comprising:

a reflector member comprising a substantially planar surface, wherein at least a portion of the substantially planar surface is reflective and forms a reflective portion; and a connecting member having a proximal end portion and an opposed distal end portion, wherein the proximal end portion is configured for releasable mounting to a portion of the camera, and the distal end portion is connected to the reflector member, wherein when the device is operatively mounted to the camera, the reflector member is spaced from and opposes the flash and the substantially planar surface is positioned at an obtuse angle relative to the flash axis that extends from the camera toward a subject, and wherein the reflective portion is sized and shaped to receive and reflect substantially all light produced from the flash away from the flash axis and away from the subject.

2. The device of claim 1, wherein the angle is from about 115 to about 120 degrees.

3. The device of claim 1, wherein the angle is approximately 118 degrees.

4. The device of claim 1, wherein the distal end portion of the connecting member comprises a foot member configured for releasably mounting therein a hot shoe of the camera.

5. The device of claim 1, wherein the connecting member comprises an elongate arm.

6. The device of claim 5, wherein the reflector member is rotatably attached to the distal end portion of the elongate arm such that the reflective portion of the reflector member can be selectively positioned at an operatively selected angle relative to the flash axis, wherein the operatively selected angle comprises at least a predetermined angle.

7. The device of claim 6, wherein the reflector member further comprises a pair of side members attached to opposing side edges of the reflector member, wherein the side members are configured to extend outwardly from the reflector member toward the flash.

8. The device of claim 1, wherein the connecting member comprises a pair of opposing side walls, wherein respective proximal end portions of the side walls are connected to a foot member configured for releasable mounting therein a hot shoe of the camera, and wherein respective distal end portions of the side walls are connected to opposing side edges of the reflector member.

9. The device of claim 8, wherein each of the opposing side walls comprises two side wall members rotatably connected to each other.

10. The device of claim 1, wherein the reflective portion of the substantially planar surface comprises a mirror.

11. The device of claim 1, wherein the reflective portion of the substantially planar surface comprises a reflective film.

12. A device for use with a camera having a built-in flash having a flash axis that extends from the camera toward a subject, comprising:
- a reflector member comprising a substantially planar surface, wherein at least a portion of the substantially planar surface is reflective and forms a reflective portion;
- a foot member configured for releasable mounting therein a portion of the camera; and
- a pair of opposing side walls having respective proximal end portions and opposing distal end portions, wherein the proximal end portions are connected to the foot member and wherein the distal end portions are connected to opposing sides of the reflector member,
- wherein, when the device is operatively mounted to the camera, the reflector member is spaced from and opposes the flash and the substantially planar surface is positioned at an obtuse angle relative to the flash axis that extends from the camera toward a subject, and wherein the reflective portion is sized and shaped to receive and reflect substantially all light produced from the flash away from the flash axis and away from the subject.

13. The device of claim 12, wherein the angle is from about 115 to about 120 degrees.

14. The device of claim 12, wherein the angle is predetermined.

15. The device of claim 12, wherein the side walls and the reflector member define a cavity having an open upper surface, and wherein the angle is selected such that when the device is operatively attached to the camera, light emitted from the flash is reflected from the reflective portion in a direction away from the camera.

16. A device for use with a camera having a built-in flash having a flash axis, comprising:
- a reflector member comprising a substantially planar surface, wherein at least a portion of the substantially planar surface is reflective and forms a reflective portion; and
- a connecting arm having a proximal end portion and an opposing distal end portion, wherein the proximal end portion comprises a foot member configured for releasable mounting therein a hot shoe of the camera, and wherein the distal end portion is connected to the reflector member,
- wherein, when the device is operatively mounted to the camera, the reflector member is spaced from and opposes the flash and the substantially planar surface is positioned at an angle relative to the flash axis, and wherein the reflective portion is sized and shaped to receive and reflect substantially all light produced from the flash away from the flash axis.

17. The device of claim 16, wherein the reflector member has a front surface and an opposing back surface, wherein the front surface comprises the reflective portion, and wherein the distal end portion of the connecting arm is connected to the back surface such that the reflector member is configured to rotate and reflect the light in a selected direction.

18. The device of claim 16, wherein the connecting arm is an elongate arm, and wherein the reflector member is rotatably attached to the distal end portion of the connecting arm such that the reflective portion of the reflector member can be selectively positioned at an operatively selected angle relative to the flash axis, wherein the operatively selected angle comprises at least a predetermined angle.

19. A device for use with a camera having a built-in flash having a flash axis, comprising:
- a reflector member comprising a substantially planar surface, wherein at least a portion of the substantially planar surface is reflective and forms a reflective portion; and
- a connecting member having a proximal end portion and an opposed distal end portion, wherein the proximal end portion is configured for releasable mounting to a portion of the camera, and the distal end portion is connected to the reflector member,
- wherein when the device is operatively mounted to the camera, the reflector member is spaced from and opposes the flash and the substantially planar surface is positioned at an angle of about 115 to about 120 degrees relative to the flash axis, and wherein the reflective portion is sized and shaped to receive and reflect substantially all light produced from the flash away from the flash axis.

20. The device of claim 19, wherein the angle is from 115 to 120 degrees.

21. A device for use with a camera having a built-in flash having a flash axis, comprising:
- a reflector member comprising a substantially planar surface, wherein at least a portion of the substantially planar surface is reflective and forms a reflective portion;
- a foot member configured for releasable mounting therein a portion of the camera; and
- a pair of opposing side walls having respective proximal end portions and opposing distal end portions, wherein the proximal end portions are connected to the foot member and wherein the distal end portions are connected to opposing sides of the reflector member,
- wherein, when the device is operatively mounted to the camera, the reflector member is spaced from and opposes the flash and the substantially planar surface is positioned at an angle of about 115 to about 120 degrees relative to the flash axis, and wherein the reflective portion is sized and shaped to receive and reflect substantially all light produced from the flash away from the flash axis.

22. The device of claim 21, wherein the angle is from 115 to 120 degrees.

* * * * *